US006193973B1

(12) United States Patent
Tuttle

(10) Patent No.: US 6,193,973 B1
(45) Date of Patent: Feb. 27, 2001

(54) DIETARY SUPPLEMENT FOR BOOSTING ENERGY AND INCREASING MUSCULAR STRENGTH

(76) Inventor: B. David Tuttle, 1830 Stoner Ave., Unit 4, Los Angeles, CA (US) 90025

( * ) Notice: Subject to any disclaimer, the term of this patent is extended or adjusted under 35 U.S.C. 154(b) by 0 days.

(21) Appl. No.: 08/917,022

(22) Filed: Aug. 22, 1997

(51) Int. Cl.[7] ........................... A61K 35/78; C07C 229/00
(52) U.S. Cl. ........................ 424/195.1; 514/962; 562/563
(58) Field of Search .......................... 424/195.1; 514/962; 562/563

(56) References Cited

U.S. PATENT DOCUMENTS

| | | | |
|---|---|---|---|
| 4,708,949 | * 11/1987 | Liu | 514/26 |
| 5,308,627 | * 5/1994 | Umbdenstock, Jr. | 424/639 |

OTHER PUBLICATIONS

E. Hultman et al, "Muscle Creatine Loading in Men", Journal of Applied Physiology, vol. 81(1), pp. 232–237 (1996).
Allan Gordon et al, "Creatine Supplementation In Chronic Heart Failure Increases Skeletal Muscle Creatine Phosphate And Muscle Performance", Cardiovascular Research, vol. 30, pp. 413–418 (1995).
Paul L. Greenhaff, "Creatine And Its Application As An Ergogenic Aid", International Journal of Sport Nutrition, vol. 5, pp. S100–S110, (1995).
Ronald J. Maughan, "Creatine Supplementation and Exercise Performance", International Journal of Sport Nutrition, vol. 5, pp. 94–101 (1995).
Tomas C. Welbourne, "Increased Plasma Bicarbonate And Growth Hormone After An Oral Glutamine Load", American Journal of Clinical Nutrition, vol. 61, pp. 1058–1061 (1995).
K.S. Zhao et al, "Enhancement Of The Immune Response In Mice By Astragalus Membranaceus Extracts", Immunopharmacology, vol. 20, pp. 225–234 (1990).
"Creatine: Nature's Muscle Builder", by Ray Sahelian and Dave Tuttle, Avery Publishing Group (Garden City Park, NY) (1997).
"Ginseng: The Energy Herb", by Christopher Hobbs, Botanica Press (Loveland, CO), pp. 24–36, pp. 96–103 (1996).
John Heinerman, "Heinerman's Encyclopedia of Healing Herbs & Spices", Prentice Hall (Eaglewood Cliffs), NJ, pp. 38–39 (1996).
Daniel B. Mowrey, Ph.D., "Herbal Tonic Therapies", Keats Publishing, Inc. (New Canaan, CT), pp. 55–59 (1993).
Dave Tuttle, "Glutamine: Athletic Benefits Times Three", Lets Live, Sep., pp. 71–73 (1997).

* cited by examiner

*Primary Examiner*—David M. Naff
*Assistant Examiner*—Janet M. Kerr
(74) *Attorney, Agent, or Firm*—Benman & Collins

(57) ABSTRACT

A dietary supplement is provided that comprises creatine combined with ginseng and astragalus and, optionally, glutamine. The dietary supplement enhances the general energy boost and muscular strength increase achieved from the consumption of creatine alone.

2 Claims, No Drawings

DIETARY SUPPLEMENT FOR BOOSTING ENERGY AND INCREASING MUSCULAR STRENGTH

TECHNICAL FIELD

The present invention relates generally to dietary supplements, and, more particularly, to a blend of creatine, ginseng, and astragalus, and, optionally, glutamine.

BACKGROUND ART

As we age, our bodies undergo a variety of changes. We often lose strength and energy due to declines in hormone levels and a more sedentary lifestyle. These changes can frequently interact with each other to produce compounding effects. For example, the loss in muscle strength increases the likelihood of falls and broken bones, which can lead to further declines in physical activity and strength. While some of these declines in strength and energy levels are inevitable, they can also result from nutritional deficiencies and changes in lifestyle patterns. This is partly responsible for the greater utilization of medical resources by senior citizens and consequent impacts on Medicare expenditures.

One muscle-building substance which does not typically exhibit any significant side effects is creatine, which is derived from reactions involving the amino acids arginine, glycine, and methionine:

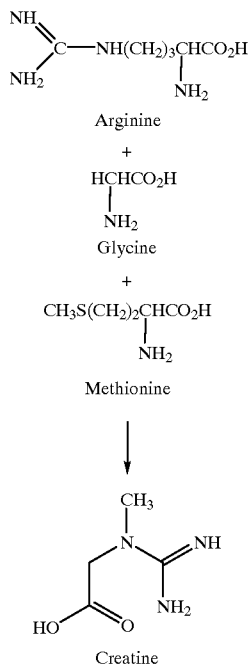

Creatine Monohydrate:

Creatine monohydrate is a nutrient that increases protein synthesis and intracellular water levels within the muscle fibers, resulting in greater strength and muscle mass. This boosts daily caloric expenditure, which will lower body-fat stores if food intake is unchanged. A discussion of the benefits may be found in a book by Ray Sahelian and Dave Tuttle, entitled *Creatine: Nature's Muscle Builder*, Avery Publishing Group (1997).

Given the well-established, beneficial effects of creatine for adding strength and power, building lean muscle mass, boosting sports endurance, and helping to reduce body fat, and the rare incidence of associated side effects, it would be desirable to provide creatine in a dietary supplement improved over that already commercially available. Such a dietary supplement should enhance the general energy-boosting and muscular strength-increasing qualities offered by creatine without introducing any harmful side effects. It should be inexpensively manufactured, and comply with all applicable government regulations.

DISCLOSURE OF INVENTION

In accordance with the present invention, a dietary supplement is provided that comprises creatine combined with ginseng and astragalus and, optionally, glutamine. The present supplement therefore enhances the general energy boost and muscular strength increase achieved from the consumption of creatine alone.

More particularly, the dietary supplement of the present invention will help mature individuals overcome the problems noted above by providing the specified three or four nutrients that work together to boost energy and enhance muscle growth. The dietary supplement will also increase the strength and sense of vitality of such mature individuals.

BEST MODES FOR CARRYING OUT THE INVENTION

Reference is now made in detail to a specific embodiment of the present invention, which illustrates the best mode presently contemplated by the inventor for practicing the invention. Alternative embodiments are also briefly described as applicable.

The dietary supplement of the invention comprises creatine, ginseng, and astragalus, optionally combined with glutamine. The dietary supplement composition is preferably put into a capsule using known technology, such that the daily dose for an adult would be one or two capsules with each meal, that is, 3 to 6 capsule per day.

The creatine employed in the practice of the present invention is of a pharmaceutical grade that is commercially available from various manufacturing sources. It is preferably in the form of creatine monohydrate. However, other creatine derivatives, such as creatine citrate, may also be employed in the practice of the invention.

In addition to creatine, the present dietary supplement contains two other complementary herbal extracts, ginseng and astragalus, and, optionally, an amino acid, glutamine, to provide benefits that enhance the nutritional quality of creatine alone. Thus, there are two possible combinations:

creatine, ginseng, and astragalus, and creatine, ginseng, astragalus, and glutamine.

Each capsule of the invention preferably contains the following ingredients, within the following ranges: (a) about 250 to 1500 mg of creatine monohydrate; (b) about 100 to 600 mg of ginseng (c) about 100 to 600 mg of astragalus; and, if employed, (d) about 100 to 600 mg of L-glutamine.

Creatine Monohydrate.

Creatine is a naturally occurring nutrient. It is found in the skeletal and cardiac muscles of all animals, including man. While it would be theoretically possible to get enough creatine to increase strength levels from eating large quantities of meat, the cholesterol and fat content of these foods makes this highly inappropriate. The preferred alternative is to use creatine monohydrate, a manufactured nutrient that is both inexpensive and highly effective.

More than 50 studies have analyzed the effects of creatine monohydrate during the 1990s. These studies have found that creatine increases muscular strength, peak torque production and mean power output. It does this by providing more raw material for the resynthesis of ATP, or adenosine triphosphate. This allows the muscles to remain within the ATP-CP energy pathway longer, and lengthens the time before muscular contraction ceases due to lactic-acid buildup. There is also an increase in lean muscle mass and protein synthesis due to a creatine-induced rise in intracellular (but not subcutaneous) water levels. While these changes are maximized with exercise, they also occur in sedentary individuals. A 1996 study by Hultman with individuals told to avoid physical exercise found that a daily dosage of 3 grams raised intracellular creatine concentrations to effective levels; see, e.g., E. Hultman et al, "Muscle creatine loading in men", *Journal of Applied Physiology*, Vol. 81(1), pp. 232–237 (1996). This is the rationale behind the 3-gram daily dosage recommendation for sedentary persons. Active individuals require more creatine to compensate for creatine metabolism during exercise. The preferred 6-gram dosage will produce noticeable gains in strength and power in these persons.

The transport mechanism used to shuttle creatine into the muscle cells involves insulin. The required spike in insulin levels is produced by the carbohydrates in a regular meal (40 to 50 grams), hence the recommendation that the dietary supplement be taken with meals. Due to its ability to increase lean mass, creatine also boosts the body's daily caloric expenditure. (Each pound of muscle requires approximately 20 calories per day to "live"). If use of the dietary supplement of the invention increases lean mass by 5 pounds, this boost in caloric requirements would result in a loss of a pound of body fat per month if food intake is unchanged.

Ginseng.

Preferably, *Panax ginseng* is employed for its warmer qualities. However, other forms of ginseng may alternatively be used. Such other forms include, but are not limited to, *Panax quinquefolius, Panax notoginseng, Eleutherococcus senticosus,* and *Acanthopanax senticosus.* The ginseng used in the formulation of the invention should be the dried extract of the root of the plant with a total saponin content of not less than 4.0 percent.

Ginseng has been revered in China as the King of Herbs for centuries. It helps to replenish the qi, or life force, of the body through a number of mechanisms. Ginseng is an adaptogen, which means that it works with the body to help restore balance. Chinese practitioners use it as a tonic to increase physical strength and energy and promote the proper functioning of the body's organs. They also use it to treat fatigue. Ginseng builds stamina and endurance by enhancing the body's ability to adapt to stress. It was used extensively in former Soviet countries as a way to boost strength and athletic performance.

The dietary supplement of the present invention preferably contains Chinese or Korean ginseng, which is recommended for its warmer qualities. *Panax ginseng* has additional properties that will be of interest to mature individuals. It strengthens the heart muscle and stimulates the immune system. It also increases cerebral circulation, which enhances memory, alertness and other cognitive functions. Some of the active principles in the herb, known as ginsenosides, have antioxidant properties as well. These benefits have been verified in over 3,000 studies conducted in the last 50 years.

Astragalus.

Astragalus is employed in the form of *Astragalus membranaceous* and should be the dried extract of the root of the plant. Astragalus works with ginseng to build energy levels, heighten immune-system activity, and increase the body's ability to adapt to stress.

While largely unknown in Western countries, astragalus has been used for thousands of years in traditional Chinese medicine as part of the Fu-Zheng therapy to enhance natural defense mechanisms. It is sometimes combined with ginseng in tonics because of its interactive actions with that herb. Astragalus is particularly effective in the sphere of influence of the spleen. The Chinese consider the spleen to be the middle burner, where the body's energy builds. Astragalus is able to supplement this energy when it is deficient, making it an excellent long-term energy builder. It has been used by Chinese herbalists to treat every type of fatigue and exhaustion.

The herb is also said to stabilize the exterior of the body and increase its resistance to disease by increasing the circulation of wei qi, or protective life force, on the body's surface. This enhances immune function and boosts the body's ability to adapt to stress. Astragalus stimulates the proliferation of stem cells, macrophages and lymphocytes as well, helping the immune system to hold off invading organisms. It has even been shown to increase the life span of human cells in culture.

Glutamine.

Glutamine is an amino acid that promotes the release of growth hormone, which also increases strength and lean muscle mass. Glutamine also promotes better assimilation of nutrients and speeds up recuperation. Preferably, the levo form, L-glutamine, is employed in the practice of the invention.

Glutamine is an important amino acid for mature individuals. It boosts the secretion of growth hormone from the pituitary gland, which can help offset the reductions in this vital hormone that occur with aging. Growth hormone has a major role in the growth and retention of muscle due to its ability to promote cell division and proliferation in the body. It increases the amount of amino acids transported across the cell membrane, which provides the raw material needed for more protein synthesis. This gives the formula another mechanism to increase strength and muscle mass. Growth hormone even boosts the level of free fatty acids in the blood, resulting in greater use of fats as an energy source and the sparing of available proteins and carbohydrates. By raising the body's energy expenditure at rest, it works beneficially with creatine to help reduce body-fat levels.

Glutamine plays a vital role in the immune system. Many of the cells of this system use glutamine for fuel. Studies have shown that supplemental glutamine speeds recuperation and helps people regain the strength they lose after an illness. Glutamine also provides fuel for the mucosal cells of the intestines, which can improve the assimilation of nutrients. It regulates the body's acid-base balance as well. This neutralizes the high levels of lactic acid that build up during exercise.

In the most preferred composition of the dietary supplement of the present invention, the ratio of creatine monohydrate relative to the other three ingredients is approximately 3:1:1:1, and is represented by the following formulation, in which each capsule contains:

| | |
|---|---|
| Creatine Monohydrate | 1,000 mg |
| Ginseng (*Panax ginseng*) | 350 mg |
| Astragalus (*Astragalus membranaceous*) | 350 mg |
| L-Glutamine | 350 mg. |

A suggested dosage is one or two capsules with each meal, or a total of three to six capsules per day.

No adverse side effects are reported in the literature at the dosages indicated herein for the listed components.

Older individuals with decreased muscle mass and energy levels may benefit from the dietary supplement of the present invention. Since creatine and L-glutamine boost strength and protein synthesis, they should help to reduce the muscle wasting process that can occur with disease and the aging process. The interactive effects of ginseng and astragalus will also help maintain energy levels in these individuals. Being more muscular and energetic can also lead to an improved sense of well-being, resulting in older individuals who look and feel years younger. Stronger muscles will lead to fewer falls and bone fractures, too. Finally, use of the dietary supplement by older individuals may motivate users to continue exercising, which itself is known to lead to stronger bones and a healthier heart.

Thus, there has been disclosed a dietary supplement comprising creatine, ginseng, and astragalus, and, optionally, glutamine. It will be readily apparent to those skilled in the art that various changes and modifications of an obvious nature may be made, and all such changes and modifications may be made without departing from the spirit of the invention, as defined by the appended claims.

What is claimed is:

1. A dietary supplement consisting essentially of the following formulation in a single capsule:
   (a) about 250 to 1500 mg of creatine monohydrate;
   (b) about 100 to 600 mg of ginseng extract having a total saponin content of at least 4.0%;
   (c) about 100 to 600 mg of astragalus extract; and
   (d) about 100 to 600 mg of L-glutamine.

2. The dietary supplement of claim 1 consisting essentially of the following formulation in said single capsule:
   (a) about 1,000 mg creatine monohydrate;
   (b) about 350 mg ginseng extract as *Panax ginseng;*
   (c) about 350 mg astragalus extract as *Astragalus membranaceous*; and
   (d) about 350 mg L-glutamine.

* * * * *